March 8, 1927. 1,619,942

G. P. LEE

AUTOMOBILE JACK

Filed Dec. 5, 1925 4 Sheets-Sheet 1

Inventor

George P. Lee

By L. B. James

Attorney

March 8, 1927.
G. P. LEE
1,619,942
AUTOMOBILE JACK
Filed Dec. 5, 1925    4 Sheets-Sheet 2
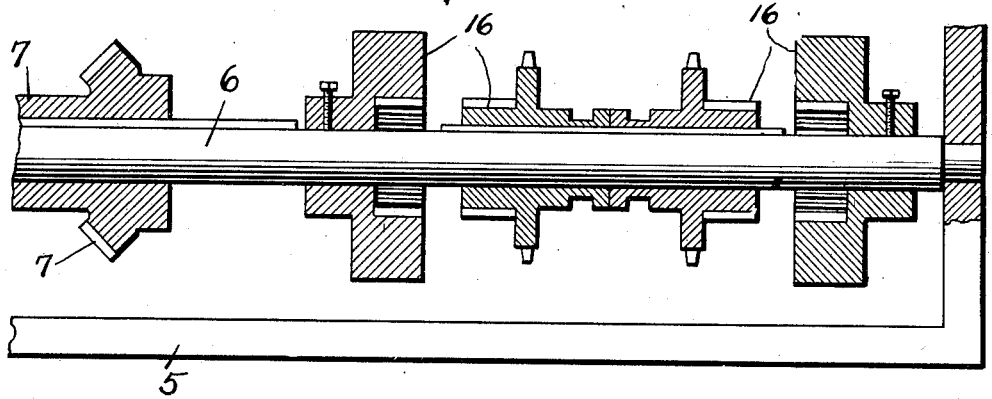
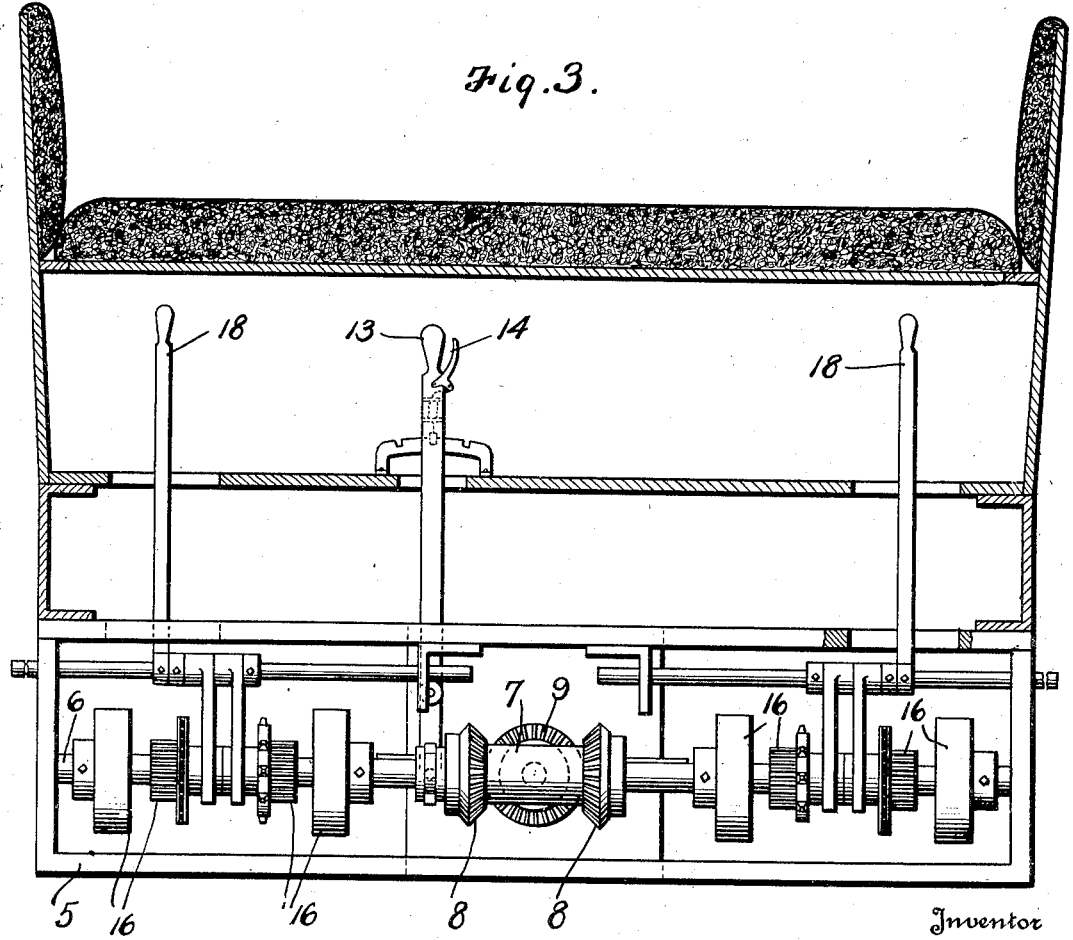
Inventor
George P. Lee
By L. B. James
Attorney March 8, 1927.

G. P. LEE

AUTOMOBILE JACK

Filed Dec. 5, 1925

Inventor

George P. Lee

By L. B. James

Attorney

March 8, 1927.  
G. P. LEE  
AUTOMOBILE JACK  
Filed Dec. 5, 1925

Inventor  
George P. Lee  
By L. B. James  
Attorney

Patented Mar. 8, 1927.

1,619,942

UNITED STATES PATENT OFFICE.

GEORGE P. LEE, OF EAST STROUDSBURG, PENNSYLVANIA.

AUTOMOBILE JACK.

Application filed December 5, 1925. Serial No. 73,305.

This invention relates to automobile equipment and more particularly to jacks therefor.

The primary object of this invention resides in the provision of a set of jacks for automobiles whereby either or all of the wheels of the automobile can be raised by the power plant of the automobile.

Another object of this invention resides in the provision of a set of jacks adapted to be carried at the front and rear of automobiles, on opposite sides thereof, so as to be operated by power transmitting means connected to the power plant of the automobile upon manipulating controlling means therefor, which is in convenient reach of the operator of the automobile.

A further object of this invention resides in the provision of a set of power operated jacks adapted to be carried by an automobile so as to be controlled by means within convenient reach of the operator of the automobile and constructed to cease operation at certain periods so as to prevent destruction thereof should the power transmitting means not be released therefrom at the proper time.

A still further object of this invention resides in the provision of a set of power operated jacks adapted to be carried on opposite sides of the axles of automobiles so as to raise either or all the wheels of the automobile by manipulating manually controlled means disposed adjacent the driver's seat.

In addition to the aforesaid objects, this invention resides in the provision of a set of jacks and power transmitting means therefor, which are adapted to constitute a unit to be attached to automobiles so as to be operated by the power plant of the automobile without alteration of the standard construction thereof.

Among the foregoing objects, this invention resides in the provision of a particularly constructed set of power jacks which readily operate throughout a certain range of movement and remain stationary upon continued movement of the power transmission at which time means associated therewith will readily and immediately cause the same to be actuated in the reverse operation.

With these and other objects in view, this invention resides in certain novel features of construction, arrangement and combination of elements to be hereinafter more specifically set forth in the specification, illustrated in the accompanying drawings and pointed out in the appended claim and, while the disclosure depicts my present conception of the invention, the right is reserved to make such changes in construction as come within the scope of the claim.

In the accompanying drawings forming a part of this application:

Fig. 2 is a cross sectional view on line 2—2 of Fig. 1;

Fig. 3 is a longitudinal sectional view on line 3—3 of Fig. 1;

Figure 1:
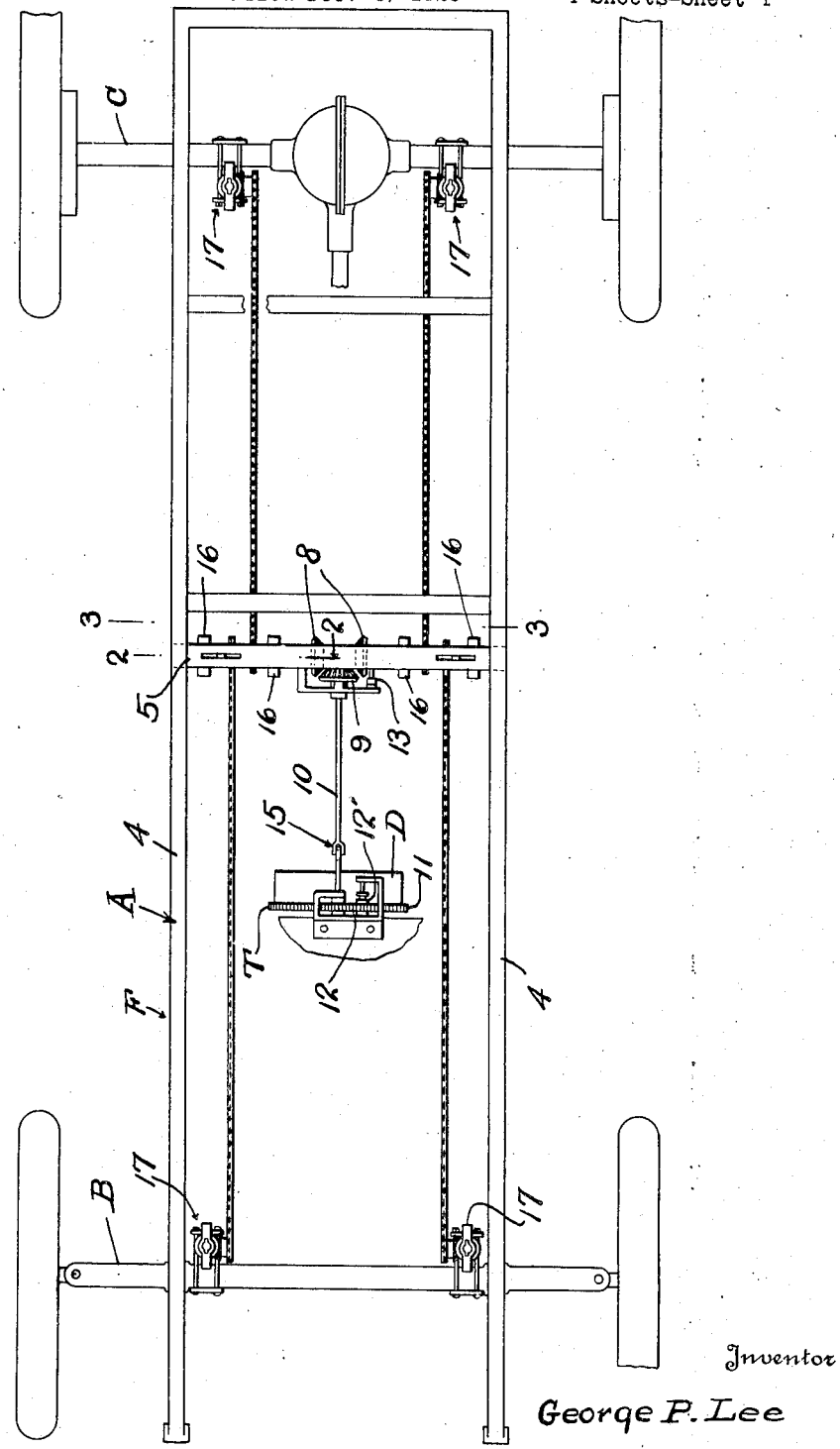
Fig. 1 is a plan view of the chassis of an automobile with the elements of this invention associated therewith.
Figure 4:
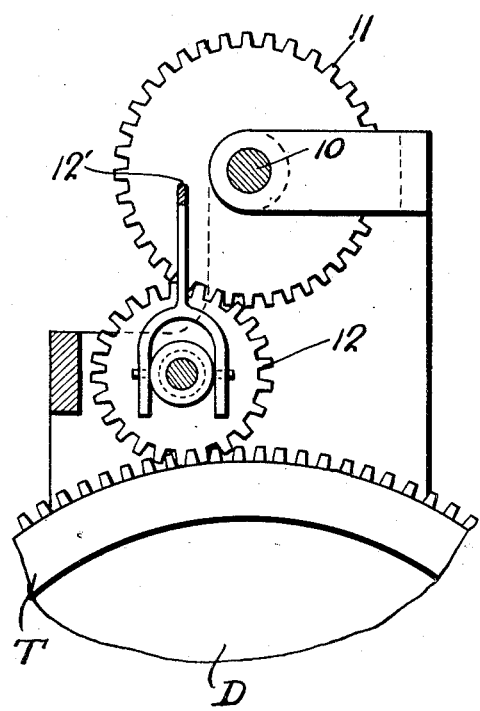
Fig. 4 is an enlarged side view of the engine flywheel and associated elements.
Figure 5:
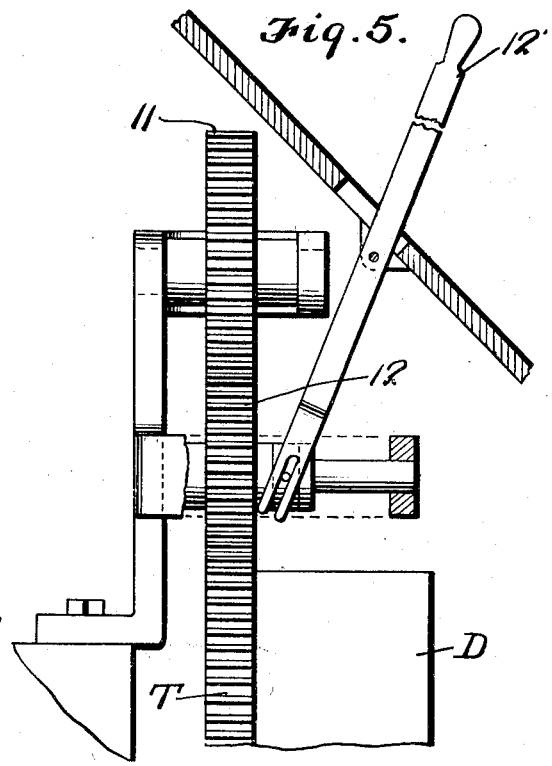
Fig. 5 is a side view thereof.
Figure 6:
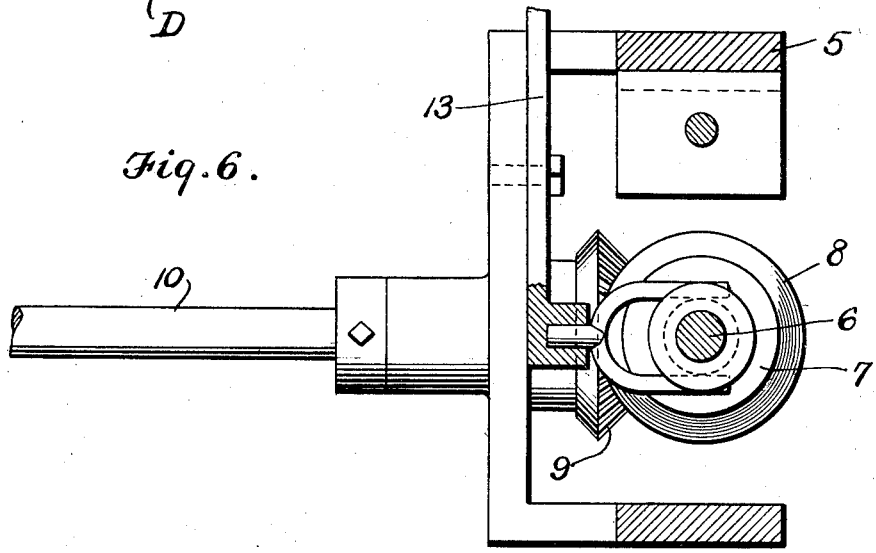
Fig. 6 is an enlarged vertical sectional view through the frame to one side of the shifting lever for the centrally disposed beveled gears.
Figure 7:
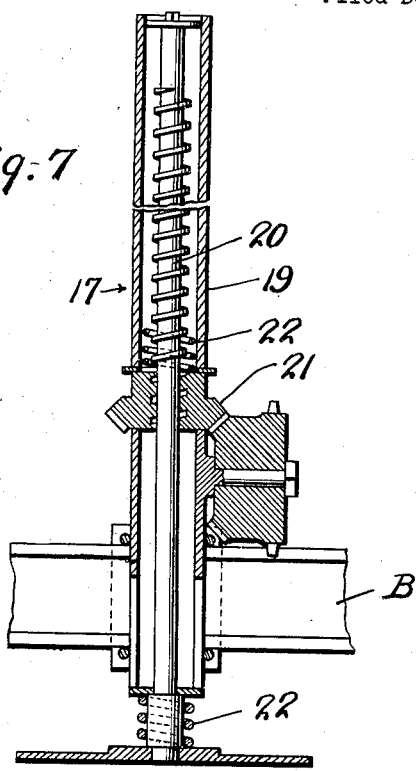
Fig. 7 is an enlarged vertical sectional view through one of the jacks.
Figure 8:
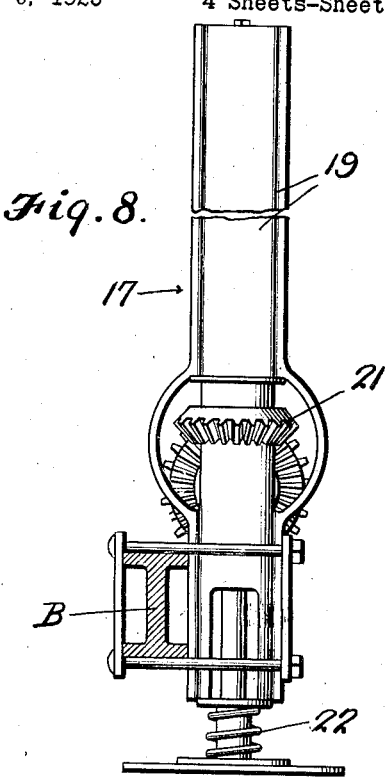
Fig. 8 is a side view thereof, showing the axle in section.
Figure 9:
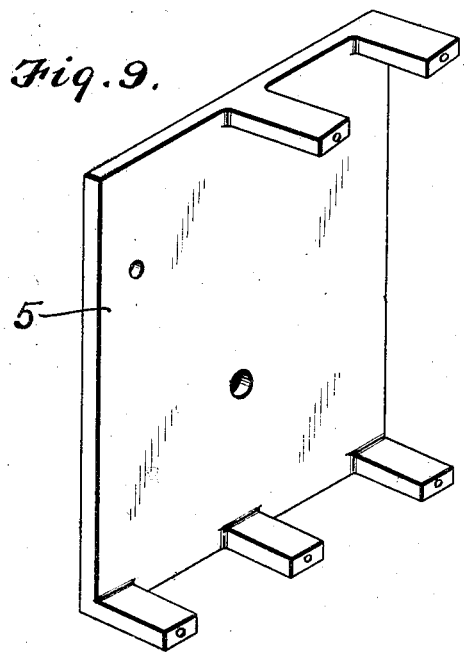
Fig. 9 is a detail perspective view of the forward central face-plate of the frame.
Figure 10:
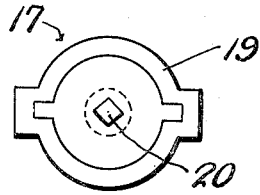
Fig. 10 is a plan view of one of the jacks.

In the present embodiment of this invention, the letter A designates a conventional illustration of an automobile chassis which, among other auxiliaries thereof, consists of a frame F, front and rear axles B and C and flywheel D of an engine (not shown) having peripheral cog teeth T, which are commonly utilized for actuating the engine by a starter.

Suitably secured laterally between the usual frame members 4 of the chassis is a detachable frame 5 in which is journaled a shaft 6.

Slidably splined approximately at the medial point of the shaft 6 is a sleeve 7 carrying opposed beveled gears 8 which are adapted to cooperate with a beveled gear 9 fixed on a shaft 10 that is connected to the usual peripheral teeth of the flywheel of an automobile engine, through the instrumentality of a train of gears 11, one of which, as indicated at 12, is adapted to be shifted in and out of mesh with its companion gear and the flywheel teeth by a lever 12' to transmit or disconnect power from the engine.

Pivoted to the frame 5, adjacent the aforesaid sleeve 7 and connected thereto is a shifting lever 13, which has its free end preferably disposed within convenient reach of the operator of the automobile so as to manipulate the gears 8 either into or out of mesh with the beveled gear 9. This lever 13 is associated with means 14 whereby it can be locked to retain either of the gears 8 in mesh with the gear 9 or locked to retain the same in neutral position whereby power from the shaft 10 will not be transmitted to the shaft 6.

In order to establish a certain degree of flexibility between the shaft 10 and associated elements, a universal joint 15 is employed, the same being also utilized to compensate for unaligned disposition of the units forming the subject matter of this invention.

Disposed on opposite sides of the sleeve 7 are suitable clutches 16, one member of each of which is fixed to the shaft 6, while their coacting elements are loosely journaled on the shaft for shifting movement into and out of engagement with the fixed elements thereof.

Connected to the loose elements of the clutches 16, as by sprockets and chains or other power transmitting elements, are operated jacks 17, which are preferably secured on opposite sides of the front and rear axles of an automobile.

The aforesaid loosely journaled elements of each pair of clutches are operated in unison by suitable levers 18, within convenient reach of the operator of the automobile, and through this arrangement of elements either of the front or rear jacks can be individually manipulated without affecting the remaining jacks or, if desired, the levers 18 can be manipulated to actuate the jacks insuccession and thereby elevate the entire automobile from the ground.

The jacks 17 utilized in the present disclosure are of the screw type and consist of casings 19 fastened to the axles of an automobile in any suitable manner, the same are adapted to accommodate a screw element 20 threadedly passing through a suitable gear 21 which is rotatably fixed in the casing in the usual manner. Each screw element 20 is provided with a smooth area at its opposite extremities to permit the gears 21 associated therewith to continue to rotate without moving the screws should power continue to be transmitted to the jacks when the screws have reached their maximum degree of movement. In order to immediately initiate movement of the screws, when the gears are idly rotated on the smooth areas thereof, springs 22 are employed to exert pressure against the gears so they will readily engage the threads of the screws as their rotation is reversed.

With the elements of this invention assembled on an automobile, it is simply necessary to operate the lever 12' to connect the mechanism to the power plant of the automobile, whereupon the lever 13 is shifted to bring the selected gear 8 into mesh with the gear 9 to initiate rotation of the shaft 10 and clutch elements fixed thereto. Having caused the shaft 10 and associated elements to rotate as aforesaid, the selected lever 18 is manipulated to engage that clutch controlling that jack adjacent the particular wheel to be elevated whereupon the screw of the jack will be projected into engagement with the ground for elevating the wheel. When the screw has become sufficiently advanced, by its associated gear, its smooth area will accommodate the gear and continued application of power will simply cause the gear to idly rotate on the screw. In order to reverse the movement of the screw and thus lower the wheel so elevated, the lever 13 is shifted to cause the other gear 8 to mesh with the gear 9.

With this invention fully set forth, it is manifest that means have been provided whereby the wheels of automobiles can be elevated by power from automobile engines without the operator leaving his seat and, through the instrumentality of the association of simple elements, the assemblage can be readily installed in standard automobiles without alteration and operated at the will of the operator.

Having thus fully described my invention, what I claim and desire to protect by Letters Patent is:

The combination with an automobile having an engine with teeth on the periphery of its flywheel and a compartment beneath the seat thereof, a U-shaped frame having a cap-plate secured to the automobile frame beneath the seat thereof, said cap-plate and bottom of the compartment being provided with laterally extending slots disposed in alignment, a shaft journaled in the ends of the U-shaped frame adjacent the base of the same, aligned shafts slidably supported at their outer ends in the U-shaped frame, brackets supporting the inner ends of said shafts, power transmitting elements including clutches carried by the first mentioned shaft, rigid shifting levers carried by the second mentioned shafts with their free ends disposed in the compartment beneath the seat and their intermediate portions extending through the slots of the cap-plate and base of the seat, fastening elements securing the opposite ends of the levers to the second mentioned shafts, pairs of yokes secured to the second mentioned shafts adjacent the shifting levers and having their free ends engaging certain of the clutches on the first mentioned shaft, a bearing plate secured to the U-shaped frame, a power shaft having one end supported by the bearing plate, a lever pivoted on the inner side of the bearing plate and having one end projecting into the compartment beneath the seat and its other end disposed adjacent opposite the first mentioned shaft, a yoke journaled in that end of the lever adjacent the first mentioned shaft with its free ends engaging certain of the clutches, and power controlling means between the engine and that end of the power shaft remote from the bearing plate.

In testimony whereof I affix my signature.

GEORGE P. LEE.